United States Patent [19]

Blaschek

[11] Patent Number: 4,533,090
[45] Date of Patent: Aug. 6, 1985

[54] APPARATUS FOR TENSIONING BAND OR WEB PORTIONS RUNNING OFF AND ONTO TWO ROLLERS

[75] Inventor: Otto Blaschek, Ascheim, Dornach, Fed. Rep. of Germany

[73] Assignee: Arnold & Richter Cine Technik GmbH & Co. Betriebs KG., Munich, Fed. Rep. of Germany

[21] Appl. No.: 515,152

[22] Filed: Jul. 19, 1983

[30] Foreign Application Priority Data

Jul. 20, 1982 [DE] Fed. Rep. of Germany ....... 3227137

[51] Int. Cl.$^3$ ............................ G11B 5/48; G11B 5/78
[52] U.S. Cl. ..................................... 242/75; 242/75.3; 242/195; 242/209
[58] Field of Search ..................... 242/75, 75.3, 75.1, 242/75.4, 75.5, 193, 194, 209, 210

[56] References Cited

U.S. PATENT DOCUMENTS

| 2,126,470 | 8/1938 | Johnson | 242/75.5 |
| 3,498,569 | 3/1970 | Kjos | 242/193 |
| 3,679,215 | 7/1972 | Roberts et al. | 242/193 X |

FOREIGN PATENT DOCUMENTS 538406  3/1977  U.S.S.R. ............................. 242/193

Primary Examiner—Stuart S. Levy
Assistant Examiner—Lloyd D. Doigan
Attorney, Agent, or Firm—Fleit, Jacobson, Cohn & Price

[57] ABSTRACT

In apparatus for tensioning film strip unwinding from one roller and running onto another roller in a cassette or camera, a D.C. motor is provided of which the armature shaft and/or the stator are freely rotatably mounted. The winding cores of the rollers are placed on the armature shaft and stator.

7 Claims, 4 Drawing Figures

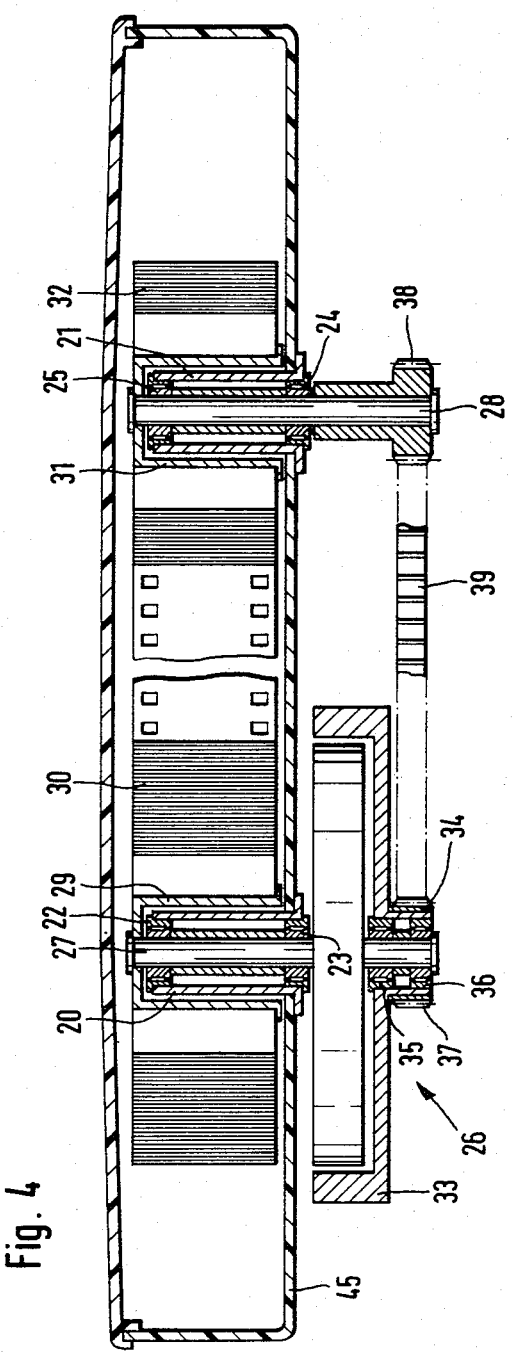

APPARATUS FOR TENSIONING BAND OR WEB PORTIONS RUNNING OFF AND ONTO TWO ROLLERS

The invention relates to an apparatus for tensioning the portions of a strip or web withdrawn from one roller and running onto another roller, preferably film strip in a cassette or camera, comprising a housing wall mounting the shafts of the film rollers.

Particularly in the case of film cassettes and film cameras, there is the problem of avoiding slack in the portions of the film between the unwinding and coiling rollers and the gear drum or the two drivingly interconnected gear drums which are usually provided with their own drive and to keep constant the length of the loop of film that is passed over the gate. If the freely led film portions become slack, there is a danger of tangling, incorrect feeding in or the trapping of free film regions in the gear drum, i.e. a so-called spaghetti tangle is likely.

To keep the free length of film running off the film roller during unwinding taut, it is known to brake the film roller with a brake shoe or adjustable friction brakes.

To keep the free length of film running onto the film roller during coiling taut, it is known to drive the film roller by way of cords with a slip effect, belt or gear belt drives which are frictionally connected to the winding shaft to produce an adequate amount of friction or to drive the roller directly by way of a motor with or without regulating the tension in the web.

Conditions become more difficult if the winding and unwinding film rollers are adapted for turning in the forward and reverse directions and film speeds arise corresponding to a frame frequency of 50 or more frames per second. At high film speeds, there are significant moments of inertia in the film rollers. To permit forward and reverse movement of the film rollers by way of free-wheeling devices, it is known to provide friction brakes for braking the unwinding film rollers. In the case of the winding film roller, it is necessary to compensate the rotary speeds resulting from the different roller diameters.

It is also known to mount a pivot lever on the common gear which drives the rollers. The ends of the pivot lever are provided with respective brake shoes for braking the winding cores and they are so coupled to the common gear by way of a friction brake that the gear applies one of the brake shoes to a ring depending on the direction of rotation, the ring being associated with the winding core to be braked.

Despite considerable constructional expense and, more recently, electronic controls used to regulate the tension, it has been completely or partially impossible to achieve reliable winding and unwinding of the film rollers.

It is therefore the problem of the invention to provide an apparatus of the aforementioned kind which is of simple construction and with which the web or film portions unwinding from or running onto the film rollers can be kept taut even at high speeds and reversal of direction to prevent incorrect running of the web.

According to the invention, this problem is solved in that the armature shaft and/or the stator of a D.C. motor are freely rotatably mounted in the housing wall and the winding cores of the rollers are placed on the armature shaft and stator. In the apparatus of the invention, the winding cores of the winding and unwinding rollers are intercoupled by the D.C. motor in a manner such that they are driven in opposite senses with a torque corresponding to the motor torque. By means of the motor, therefore, there is a rocker-like coupling between the two winding cores, although different tensile forces can occur in the winding and unwinding film portions corresponding to the different coil radii. In the case of a film cassette or film camera, the apparatus of the invention ensures for example that the film portions running onto and off the rollers are kept taut because the D.C. motor immediately seeks to wind the free lengths of film back onto the rollers. Even at the highest film speeds and upon reversal of direction of rotation, the freely led lengths of film are kept taut and it is impossible to feed the film incorrectly.

Since in film cassettes and film cameras the unwinding and winding film portions are operatively interconnected by one or two gear drums for the purpose of maintaining constant lengths of loop of the film portion running over the gate, a driving force is required to drive the gear drums that, apart from the accelerating forces, only has to overcome the frictional forces and the torque of the motor coupling the winding cores of the rollers in so far as the different coil radii produce an imbalance in the tensile forces exerted on the winding and unwinding film portions. Since the tensile forces act on the gear drums in opposite senses, the drive motor for the gear drums has to overcome the difference between these tensile forces, which is small. The current for the D.C. motor coupling the winding cores of the rollers has to be supplied by way of slip rings. Further, the motor should be so designed that it does not become over-heated when standing still. The consumption of current by the D.C. motor is substantially compensated in that only lower drive forces are necessary to move the loop of film over the gate because of the absence of torques for braking the two winding cores.

In an embodiment of the invention, one winding core is placed on the armature shaft or stator and the other, which is secured to a shaft mounted in the housing parallel to the armature shaft, is driven by a toothed belt or gearing from the stator or armature shaft without winding core. This construction permits the winding cores to be arranged in one plane on parallel axes in the case of single cavity cassettes.

Desirably, the motor shaft is freely rotatably mounted in the housing of a cassette and a winding core is secured on the stator, a toothed belt disc being secured on the motor shaft that drives the shaft of the other winding core mounted in the housing by way of a toothed belt.

According to a further embodiment of the invention, a torsion spring is stressed between the motor shaft and the winding core placed thereon or driven thereby. This construction ensures that the film portions unwinding from the rollers are also kept taut if the D.C. motor turning the winding cores in opposite senses is switched off.

According to a development of the invention, for the purpose of feeding the film loop over the gate, the motor shaft carrying the unwinding roller or the stator is provided with braking means which frictionally couple same to the housing. To enable the driving torque to be controlled, means may be provided for controlling the braking torque and/or the motor torque.

One example of the invention will not be described in more detail with reference to the drawing, wherein:

FIG. 4 is a section on the line IV-IV of the single cavity cassette according to FIG. 3.

Figure 1:
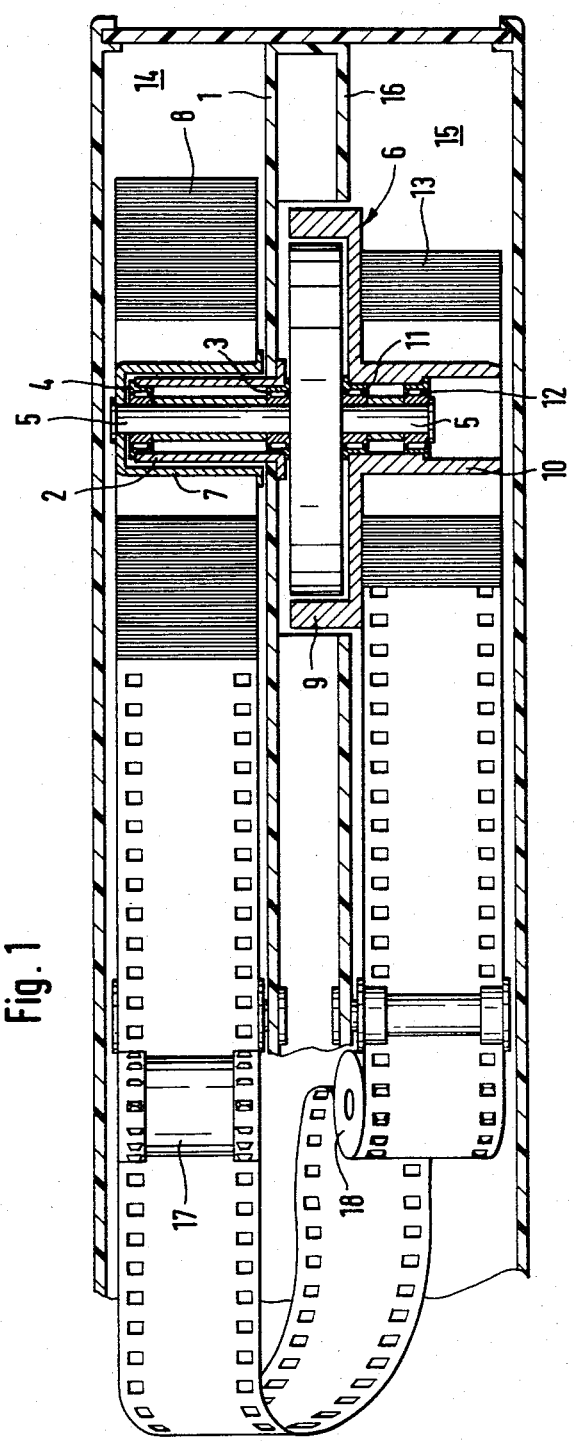
FIG. 1 is a diagrammatic longitudinal section through a film cassette (coaxial cassette) with coaxial arrangement of the film rollers.
Figure 2:
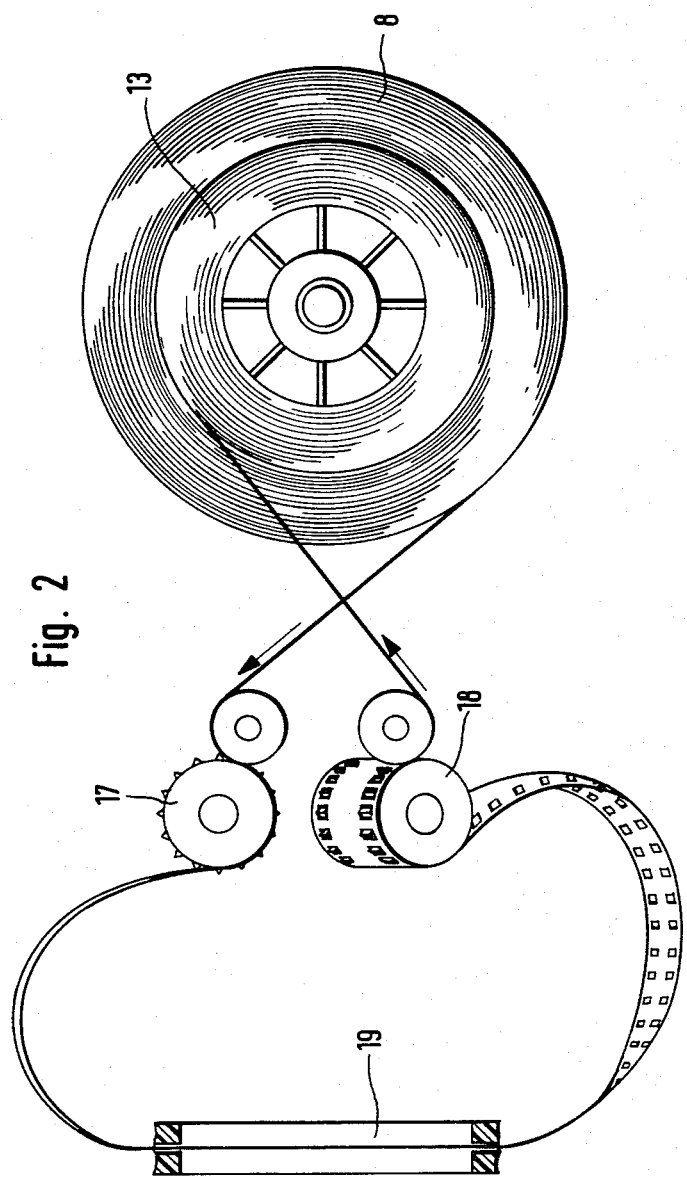
FIG. 2 is a side elevation of the coaxial cassette according to FIG. 1.

In the example of FIGS. 1 and 2, a flange 2 is secured in the wall 1 of the coaxial cassette. The armature shaft 5 of the D.C. motor 6 is mounted by way of roller bearings 3, 4 in the flange 2. A sleeve-like cap 7 screwed onto the end of the armature shaft 5 envelops the flange 2 at a slight spacing and serves to receive and secure the film roller 8.

The stator 9 of the D.C. motor 6 comprises a central tubular extension 10 mounted on the opposite end of the armature shaft 5 by way of roller bearings 11, 12. The tubular extension 10 serves to receive and mount the film roller 13. The film roller 8 is located in the chamber 14 and the film roller 13 in chamber 15 of the coaxial cassette, the chambers being separated by the parallel walls 1, 16. The wall 16 is provided with a circular aperture in which the stator 9 of the motor 6 is disposed.

The portion of film running off or onto the film roller 8 runs over the gear drums 17, 18 and is fed in a known manner between these gear drums over the gate 19. Because it is known, such feeding is not described in more detail. The gear drum 18 is slightly oblique to facilitate transfer of the film between the planes of the film rollers 8, 13.

Guiding of the film between the film rollers is diagrammatically illustrated in FIG. 2.

Current is supplied to the D.C. motor 6 by way of slip rings (not shown). By means of the D.C. motor 6, the film rollers 8, 13 are driven in opposite senses so that the free lengths of film are always taut.

Figure 3:
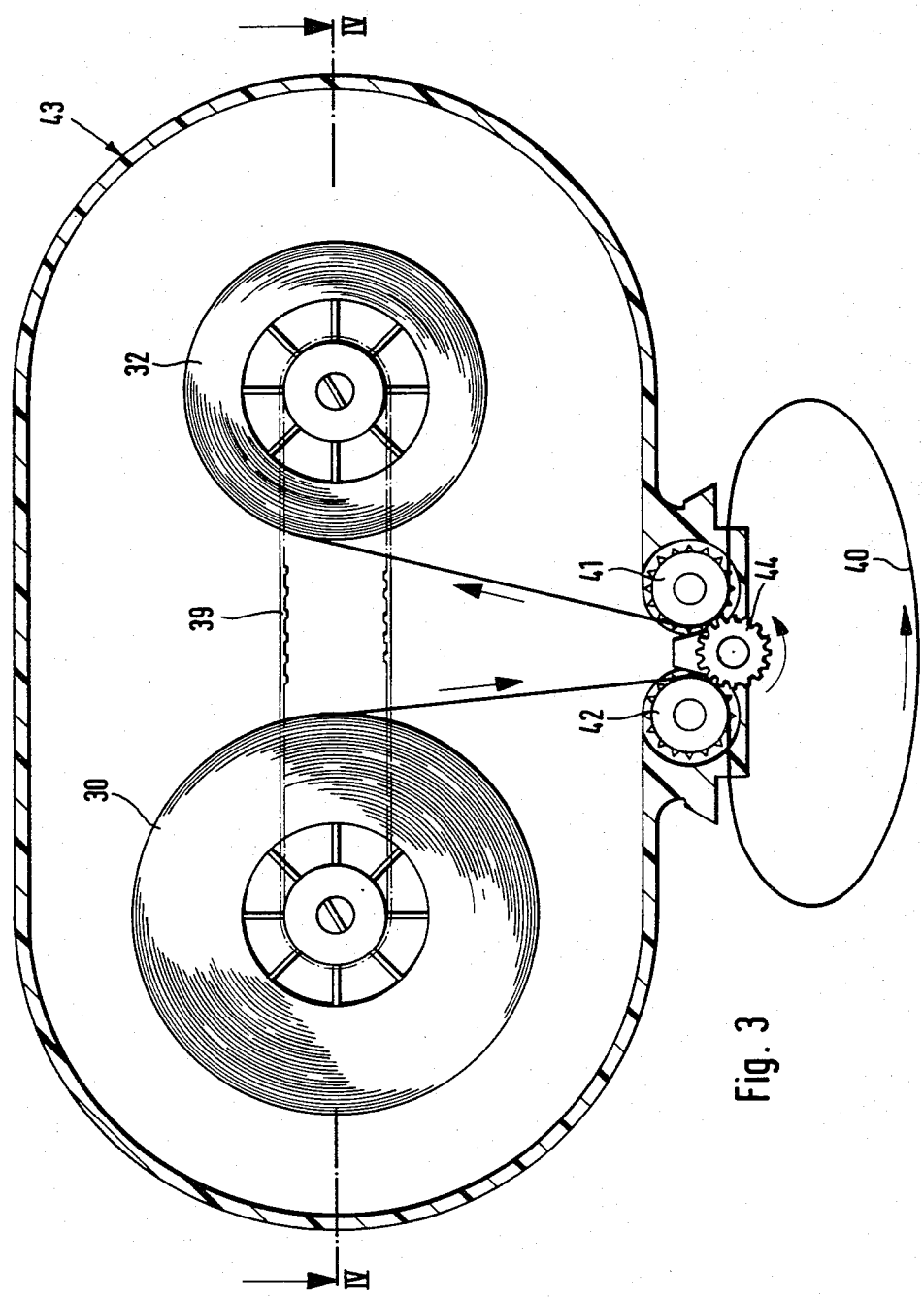
FIG. 3 is a diagrammatic side elevation of a single cavity cassette.

In the single cavity cassette of FIGS. 3 and 4, spaced parallel flanges 20, 21 are secured in the base 19 of the cassette. In these flanges, the armature shaft 27 of motor 26 is rotatably mounted by way of roller bearings 22, 23 and the shaft 28 by way of roller bearings 24, 25. A sleeve-like cap 29 screwed onto the armature shaft 27 surrounds the flange 20 at a spacing and serves to receive and secure the film roller 30. Similarly, a cap-shaped sleeve 31 is screwed onto shaft 28, surrounds flange 21 at a spacing and serves to receive and secure the film roller 32.

The stator 33 of D.C. motor 26 is provided with a central tubular extension 34 mounted on armature shaft 27 by way of roller bearings 35, 36. The tubular extension 34 is provided with a toothed ring 37. A corresponding gear 38 is likewise placed on shaft 28 outside the cassette. The toothed belt 39 connecting the shaft 28 to the stator 26 runs over the toothed rind 37 and the gear 38.

As will be evident from FIG. 3, the loop 40 of film running over the gate is led out of the single cavity cassette 43 over oppositely driven gear drums 41, 42 which are drivingly interconnected by way of the gear 44 in mesh therewith.

I claim:

1. Apparatus for tensioning first and second portions of a strip or web unwinding from a feed roller and winding onto a takeup roller, such as film strip in a film cassette or camera, said apparatus comprising:

a housing wall;

a D.C. motor supported in the housing wall and including a stator and an armature shaft, both the stator and the armature shaft being rotatably carried in the housing wall, so that the stator and armature shaft are each rotatable relative to each other and are each rotatable relative to the housing wall;

first driving connection means extending between and interconnecting the rotatably mounted stator and one of the rollers;

second driving connection means extending between and interconnecting the rotatably mounted armature shaft and the other of the two rollers;

and feed means positioned to drivingly contact the strip or web between the rollers for feeding an unrolled third portion of the strip or web in untensioned condition while the first and second portions are in tension.

2. Apparatus according to claim 1, wherein one of the rollers is secured to one of the armature shaft and stator and the other roller is secured to a support shaft rotatably carried in the housing wall, and power transmission means extending between the other of the armature shaft and stator and the other roller.

3. Apparatus according to claim 2, wherein the housing wall forms one wall of a housing that encloses the feed roller and the takeup roller in a single chamber, and the support shaft is positioned so that its axis is spaced from and parallel to the axis of the armature shaft.

4. Apparatus according to claim 1, wherein the feed roller and the takeup roller are coaxial.

5. Apparatus according to claim 4, wherein the power transmission means includes a first gear secured to the support shaft, a second gear secured to the stator, and a toothed belt extending over each of the gears to provide a driving connection between the support shaft and the stator.

6. Apparatus according to claim 1, wherein the first driving means includes a support shaft spaced from the armature shaft, and power transmission means extending between the support shaft and the stator.

7. Apparatus according to claim 1, wherein said housing wall forms a dividing wall in a unitary housing to divide the same into two separate chambers, the feed roller being rotatably supported within one of the chambers, and the takeup roller being rotatably supported in the other chamber.

* * * * *